US012663662B2

(12) United States Patent
Amir et al.

(10) Patent No.: US 12,663,662 B2
(45) Date of Patent: Jun. 23, 2026

(54) METHOD AND SYSTEM FOR AUTOMATICALLY EVALUATING THE RELEVANCE OF THE DESIGN OF AN EYEGLASSES FRAME

(71) Applicant: ESSILOR INTERNATIONAL, Charenton-le-Pont (FR)

(72) Inventors: Bruno Amir, Saint Maur des Fosses (FR); Asma Lakhoua, Paris (FR)

(73) Assignee: Essilor International, Charenton-le-pont (FR)

( * ) Notice: Subject to any disclaimer, the term of this patent is extended or adjusted under 35 U.S.C. 154(b) by 260 days.

(21) Appl. No.: 18/557,259

(22) PCT Filed: May 31, 2022

(86) PCT No.: PCT/EP2022/064738
§ 371 (c)(1),
(2) Date: Oct. 25, 2023

(87) PCT Pub. No.: WO2023/274644
PCT Pub. Date: Jan. 5, 2023

(65) Prior Publication Data
US 2024/0210740 A1      Jun. 27, 2024

(30) Foreign Application Priority Data

Jun. 28, 2021    (EP) .................................... 21305885

(51) Int. Cl.
G02C 13/00          (2006.01)
(52) U.S. Cl.
CPC .................................. G02C 13/003 (2013.01)

(58) Field of Classification Search
CPC .......................... G02C 13/003; G06Q 30/0621
USPC ..................................................... 351/41, 178
See application file for complete search history.

(56) References Cited

U.S. PATENT DOCUMENTS

| 9,810,927 B1 | 11/2017 | Fenton et al. |
| 2013/0006814 A1 | 1/2013 | Inoue et al. |
| 2015/0055085 A1 | 2/2015 | Fonte |
| 2016/0124246 A1 | 5/2016 | Rego |

(Continued)

FOREIGN PATENT DOCUMENTS

| CN | 105637512 A | 6/2016 |
| CN | 105678391 A | 6/2016 |

(Continued)

OTHER PUBLICATIONS

International Search Report and Written Opinion of the ISA for PCT/EP2022/064738 mailed Sep. 8, 2022, 13 pages.

(Continued)

*Primary Examiner* — Tuyen Tra
(74) *Attorney, Agent, or Firm* — NIXON & VANDERHYE, PC

(57)          ABSTRACT

This computer-implemented method for automatically evaluating a relevance of a design of an eyeglasses frame includes: obtaining a predetermined frame having a predetermined design; obtaining information relating to a current representation of the predetermined frame; and evaluating, by at least one processor, a relevance of the predetermined design, from the current representation, according to at least one predetermined relevance criterion and providing, by the at least one processor, a feedback including a result of the evaluating.

17 Claims, 2 Drawing Sheets

(56)            References Cited

U.S. PATENT DOCUMENTS

| | | |
|---|---|---|
| 2016/0162965 A1 | 6/2016 | Lee et al. |
| 2018/0149886 A1 | 5/2018 | Zweerts et al. |
| 2018/0217405 A1 | 8/2018 | Anatole |
| 2019/0146243 A1 | 5/2019 | Parandian |
| 2019/0250433 A1 | 8/2019 | Lore et al. |

FOREIGN PATENT DOCUMENTS

| | | | |
|---|---|---|---|
| CN | 107850418 | A | 3/2018 |
| CN | 109791312 | A | 5/2019 |
| EP | 2746838 | A1 | 6/2014 |
| JP | H09120395 | A | 5/1997 |
| JP | 2011192189 | A | 9/2011 |
| JP | 2016537716 | A | 12/2016 |
| JP | 2019515355 | A | 6/2019 |
| JP | 2022507560 | A | 1/2022 |
| WO | 2014195471 | A1 | 12/2014 |
| WO | 2017021633 | A1 | 2/2017 |
| WO | 2020099429 | A1 | 5/2020 |

OTHER PUBLICATIONS

Office Action, issued in Chinese Patent Application No. 202280032131.0 dated Oct. 14, 2025.
Office Action, issued in Japanese Patent Application No. 2023-573642 dated Jan. 27, 2026.

METHOD AND SYSTEM FOR AUTOMATICALLY EVALUATING THE RELEVANCE OF THE DESIGN OF AN EYEGLASSES FRAME

CROSS-REFERENCE TO RELATED APPLICATIONS

This application is the U.S. national phase of International Application No. PCT/EP2022/064738 filed May 31, 2022, which designated the U.S. and claims priority to EP 21305885.2 filed Jun. 28, 2021, the entire contents of each of which are hereby incorporated by reference.

FIELD OF THE DISCLOSURE

The present disclosure relates to a method and system for automatically evaluating the relevance of the design of an eyeglasses frame.

BACKGROUND OF THE DISCLOSURE

In the state of the art, customizing an eyeglasses frame usually involves several types of professionals, in addition to the "user" of the eyeglasses frame. The "user" is the person either wearing or using the eyeglasses frame, in other words, a customer who is interested in acquiring customized or personalized glasses.

By way of non-limiting example, those "several types of professionals" may include an eyeglasses frame designer and/or an ophthalmic lens designer and/or a frame manufacturer and/or an ophthalmic lens manufacturer and/or an Eye Care Professional (also referred to as an ECP).

Based on the user's aesthetical and possibly technical preferences, or cost criteria expressed by that user, a number of actions by those professionals and interactions between such professionals generally take place in the process of customization, until the proposed eyeglasses frame is acceptable both for the user and the professionals involved in design, manufacturing and selling.

For example, the frame designer will propose a frame design, but without knowing a priori whether it is relevant. This is because very numerous design parameters are available to the frame designer regarding the shape, color, material or weight of the frame. Besides, many different types of customer markets are to be addressed. Furthermore, the frame designer does not necessarily know whether the proposed design is technically easily feasible or maybe not feasible at all.

Thus, there is a need to provide the frame designer with a tool making it possible for him/her to evaluate the relevance of his/her frame design, so that he/she can modify or correct it, in case the level of relevance is not satisfactory.

SUMMARY OF THE DISCLOSURE

An object of the disclosure is to overcome the above-mentioned drawbacks of the prior art.

To that end, the disclosure provides a computer-implemented method for automatically evaluating a relevance of a design of an eyeglasses frame, wherein it comprises:
(i) obtaining a predetermined frame having a predetermined design;
(ii) obtaining information relating to a current representation of the predetermined frame;
(iii) evaluating, by at least one processor, a relevance of the predetermined design, from the current representation, according to at least one predetermined relevance criterion and providing, by the at least one processor, a feedback comprising a result of the evaluating.

Therefore, the disclosure makes it possible to supply the frame designer with a feedback regarding the relevance of a proposed frame design evaluated in a fully automated manner.

As a result, the frame designer may modify some of the design parameters so as to improve the relevance of the proposed frame design.

In an embodiment, the method further comprises steps of:
(iv) checking whether the result reaches a predetermined target;
(v) as long as the result does not reach the target:
  providing, in the feedback, recommendations as to how to modify the representation of the predetermined frame;
  based on these recommendations, obtaining modified information relating to a modified representation of the frame; and
  iterating steps (iii) to (v) by using the modified representation as the current representation of the frame, so as to provide an optimized frame design.

In that embodiment, the evaluating based on the modified representation comprises assigning to the result a value closer to the target if the modified representation of the frame has at the same time features in common with an initial representation of the frame, which is the current representation when step (ii) is carried out for the first time, and features different from the initial representation, than if the frame has no features in common with the initial representation.

In an embodiment, the feedback further comprises providing at least one proposed frame design having features in common with the predetermined design and features that are different from the predetermined design, the feedback comprising identifying the features in common and the features that are different.

In an embodiment, the method further comprises manufacturing a frame having the optimized frame design.

In an embodiment, the relevance criterion is related to at least one parameter taken in a group comprising:
  resemblance or deviation between the representation of the frame and existing frames,
  compliance with predetermined frame design rules,
  manufacturability,
  expected number of sales of the frame and/or number of sales of at least one other frame having a predetermined resemblance with the frame.

In an embodiment, the relevance criterion is related to compliance with at least one wearer-related parameter, taken in a group comprising:
  morphological parameters related to a face of a predetermined wearer population;
  parameters related to a lens prescription of the wearer population;
  other lens parameters; and
  preferred parameters provided by the wearer population.

In that embodiment, the preferred parameters provided by the wearer population are taken in a group comprising parameters relating to the general look, style, shape, material, color and wearing comfort of the eyeglasses frame.

In an embodiment, the result comprises a score and/or a text.

In an embodiment, the feedback further comprises criteria related to expected commercial success, taken in a group comprising:

an expected turnover to be obtained with an eyeglasses frame having a design corresponding to the current representation, a number of expected sales of an eyeglasses frame having a design corresponding to the current representation, an expected or real number of people viewing online an eyeglasses frame design corresponding to an initial representation of the frame, which is the current representation when step (ii) is carried out for the first time, an expected level of retail price of an eyeglasses frame having a design corresponding to the current representation, an expected type of customer to be interested in buying an eyeglasses frame having a design corresponding to the current representation, a wearer or customer's opinion about at least one eyeglasses frame design, at least one output of an artificial intelligence-based tool predicting wearers' preferences on the basis of data gathered from a plurality of wearers.

In an embodiment, step (ii) further comprises:

allocating the information relating to a current representation of the frame to at least one predetermined cluster referring to categories taken in a group comprising a type of eyewear, a type of frame, a frame weight, a frame volume, a type of nose pad, a type of face shape; and segmenting the at least one cluster based on frame color and/or frame material, wherein the feedback comprises at least one feedback criterion for a frame in the same cluster and having the same color and/or material.

To the same end as mentioned above, the disclosure also provides a computer-implemented method for a wearer to obtain an automatically performed evaluation of a relevance of a design of an eyeglasses frame, wherein it comprises:

providing to at least one processor, by the wearer, at least one parameter relating to the wearer and/or related to the frame design;

evaluating, by the at least one processor, a relevance of a frame design matching the at least one parameter, according to at least one predetermined relevance criterion and receiving, by the wearer, from the at least one processor, a feedback comprising a result of the evaluating.

Thus, the wearer receives a feedback obtained in a fully automated manner about the relevance of the frame designed on the basis of parameters he or she provided.

To the same end as mentioned above, the present disclosure also provides a system for automatically evaluating a relevance of a design of an eyeglasses frame, wherein it comprises:

at least one processor configured for:

(i) obtaining a predetermined frame having a predetermined design;

(ii) obtaining information relating to a current representation of the predetermined frame;

evaluating a relevance of the predetermined design, from the current representation, according to at least one predetermined relevance criterion and providing, by the at least one processor, a feedback comprising a result of the evaluating.

To the same end as mentioned above, the disclosure also provides a computer program product comprising one or more sequences of instructions that are accessible to a processor and that, when executed by the processor, cause the processor to:

(i) obtain a predetermined frame having a predetermined design;

(ii) obtain information relating to a current representation of the predetermined frame;

(iii) evaluate a relevance of the predetermined design, from the current representation, according to at least one predetermined relevance criterion and providing, by the at least one processor, a feedback comprising a result of the evaluating.

To the same end as mentioned above, the disclosure also provides a non-transitory information storage medium, wherein it stores one or more sequences of instructions that are accessible to a processor and that, when executed by the processor, cause the processor to:

(i) obtain a predetermined frame having a predetermined design;

(ii) obtain information relating to a current representation of the predetermined frame;

(iii) evaluate a relevance of the predetermined design, from the current representation, according to at least one predetermined relevance criterion and providing, by the at least one processor, a feedback comprising a result of the evaluating.

As the method for a wearer to obtain an automatically performed evaluation of a relevance of a design of an eyeglasses frame, the system for automatically evaluating a relevance of a design of an eyeglasses frame, the computer program product and the non-transitory information storage medium have particular features and advantages similar to those listed above in relationship to the method for automatically evaluating a relevance of a design of an eyeglasses frame, those particular features and advantages are not repeated here.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF THE DISCLOSURE

Figure 1:
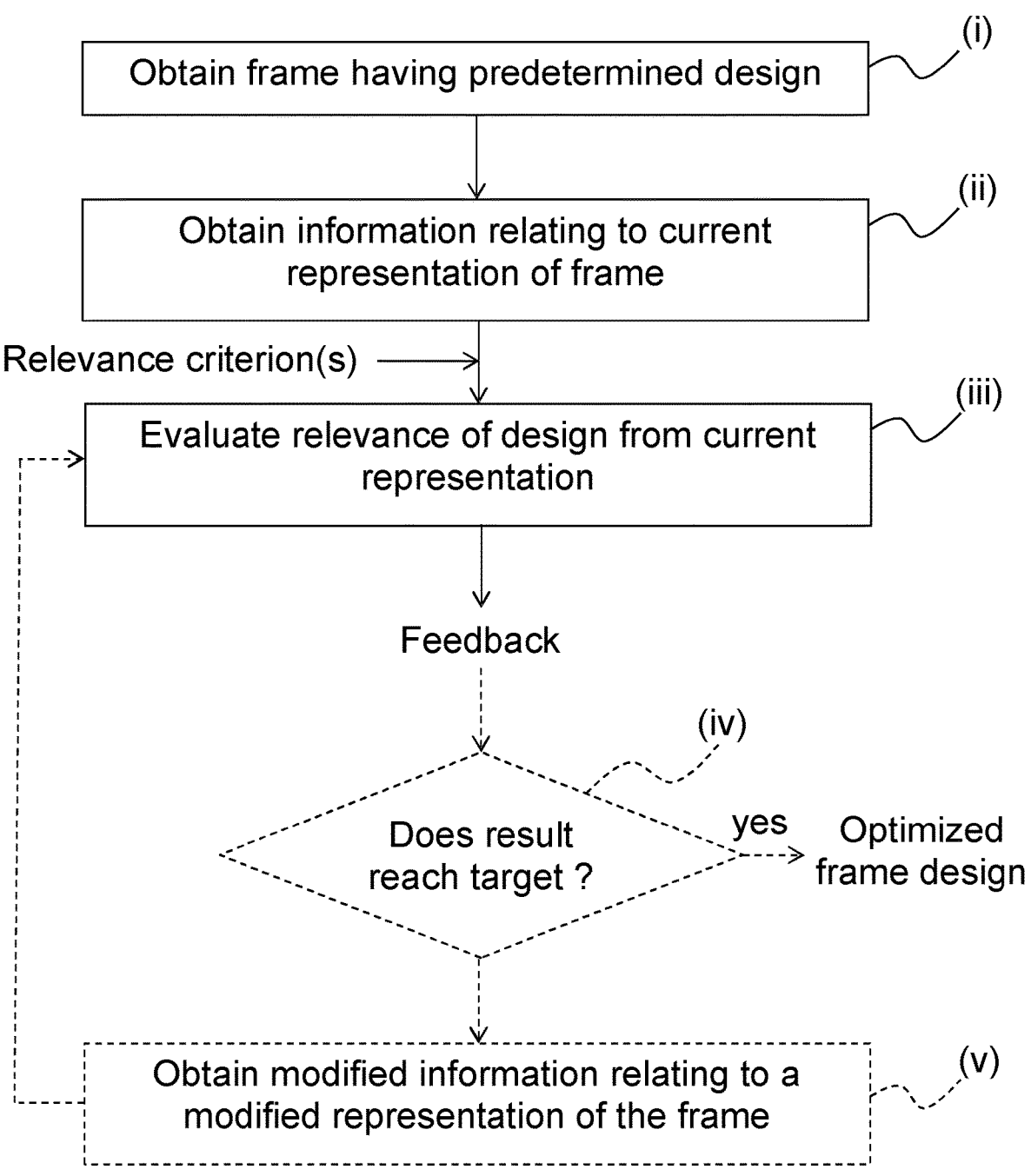
FIG. 1 is a flowchart showing steps of a method for automatically evaluating the relevance of the design of an eyeglasses frame according to the disclosure, in a particular embodiment.

In the description which follows, although making and using various embodiments are discussed in detail below, it should be appreciated that as described herein are provided many inventive concepts that may embodied in a wide variety of contexts. Embodiments discussed herein are merely representative and do not limit the scope of the disclosure. It will also be obvious to one skilled in the art that all the technical features that are defined relative to a process can be transposed, individually or in combination, to a device and conversely, all the technical features relative to a device can be transposed, individually or in combination, to a process and the technical features of the different embodiments may be exchanged or combined with the features of other embodiments.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises", "has", "contains", or "includes" one or more steps or elements possesses those one or more steps or elements, but is not limited to possessing only those one or more steps or elements.

The processor(s) within the terms of the disclosure may comprise dedicated hardware as well as hardware capable of executing software in association with appropriate software. This may consist in a single dedicated processor, a single shared processor, or a plurality of individual processors, some of which may be shared. Moreover, explicit use of the term "processor" should not be construed as referring exclusively to hardware capable of executing software, but refers in a general way to a processing device, which can for example include a computer, a microprocessor, an integrated circuit, or a programmable logic device (PLD). Additionally, the instructions and/or data enabling to perform associated and/or resulting functionalities may be stored on any processor-readable medium such as e.g. an integrated circuit, a hard disk, a CD (Compact Disc), an optical disc such as a DVD (Digital Versatile Disc), a RAM (Random-Access Memory) or a ROM (Read-Only Memory). Instructions may be notably stored in hardware, software, firmware or in any combination thereof.

A computer-implemented method according to the disclosure is for automatically evaluating the relevance of a design of an eyeglasses frame to be used by an individual.

As a non-limiting example, the individual may be a customer who intends to order or orders and/or who intends to purchase or purchases an eyeglasses frame after customizing the same. The individual may make the order or purchase, either for himself/herself (the individual may thus be the eyeglasses wearer himself/herself), or for someone else, after having such eyeglasses frame customized for the other person.

The order or purchase may take place in a physical i.e. real shop or store, where the method according to the disclosure runs on a computer, tablet, smartphone or on any other electronic device. As a variant, the individual may order and/or may purchase the eyeglasses 100% online i.e. on the Internet, without any assistance from an ECP.

Referring to the flowchart of FIG. 1, in a particular embodiment, the method according to the disclosure comprises a first step (i) of obtaining a predetermined frame having a predetermined design.

This frame may be selected for example by the individual or by the ECP, for example among a plurality of frames proposed by various frame designers, available online or in a shop.

Then, the method according to the disclosure comprises step (ii) of obtaining information relating to a current representation of the predetermined frame.

By way of non-limiting example, such information may be retrieved from the eyeglasses frame if it already physically exists, or may be a two-dimension (hereafter referred to as "2D") sketch of the eyeglasses frame, such sketch having been made by a human eyeglasses frame designer directly in electronic form, either for a part of the sketch or for the entirety thereof, e.g. on a computer and/or tablet and/or smartphone or any other electronic device.

As another possibility, the 2D sketch of the eyeglasses frame may have been made by the designer on a piece of paper with a pen or any other non-virtual writing, drawing or painting tool and may have been scanned or otherwise converted into a set of digital data, such set of data being contained in a permanent or temporary file that may be contained in a database, on a hardware electronic device or on a telecommunications network such as the Internet, e.g. in the cloud. In other words, the above-mentioned step (ii) of obtaining information may comprise retrieving that information from a database.

As still another possibility, the sketch may be a three-dimension (hereafter referred to as "3D") representation of the frame of the eyeglasses, such as a provisional or final version of a prototype of the frame conceived or provided by the frame designer, or a provisional or final version of a shape of the frame conceived or provided by the frame designer, or a provisional or final version of a model of the frame conceived or provided by the frame designer. Such 3D sketch may for example be available on a Computer-Aided or Computer-Assisted Design (CAD) tool, or it may be the result of a manufacturing process, e.g. a process involving conventional and/or additive manufacturing.

In still another embodiment, step (ii) of obtaining the above-mentioned information may comprise generating that information by using artificial intelligence or machine learning. For example, a neural network may be appropriately trained e.g. by human designers or ECPs and it may then be used for automatically sketching original eyeglasses frames, based on previously learnt frame designs.

In step (ii), by way of non-limiting example, by automatically receiving data e.g. from a database, or by automatically downloading or otherwise retrieving data from the database, the method according to the disclosure obtains as information a set of data relating to the 2D sketch, or a set of data relating to a 2D projection of the sketch in case the sketch is tridimensional (hereafter referred to as "3D").

The information may be obtained or provided in various standard formats of data files such as IGES for geometry data, SVG or PDF (vectorial), AI (Adobe® Illustrator®) or STEP.

The designer may upload the design into a database which may be filled by hundreds or thousands of designers. Each designer may thus propose different designs which will then be offered to users (ECPs, or wearers online, or any other customers, such as eyewear manufacturers, including frame and lens manufacturers).

Optionally, the current representation of the eyeglasses frame may be made available to the user (an ECP, or a wearer, or any other customer) via a database. The database may be accessed remotely. Thus, the user may express preferences for obtaining a design which best answers his/her needs, for example based on aesthetics and/or ergonomics considerations.

By way of non-limiting example, the current representation of the eyeglasses frame may comprise the design of the front face of the frame.

Optionally, in step (ii), a design of the temple or of the hinge of the eyeglasses frame may also be proposed by the human or virtual designer. In a variant, if absent from the representation of the eyeglasses obtained in step (ii), the design of the temple or of the hinge of the eyeglasses frame may be automatically determined.

In an embodiment, different eyeglasses frame designers may propose eyeglasses frame models, which they may upload in a database as soon as the considered model is complying with aesthetics and comfort rules which may have been previously uploaded in the database.

The current representation of the predetermined frame may also comprise one or more other parameters regarding the frame.

The frame parameter(s) may be taken among the following ones:

parameters relating to geometry of the eyeglasses frame;
parameters relating to material of the eyeglasses frame; and
parameters relating to manufacturing techniques for manufacturing the eyeglasses frame.

By way of non-limiting example, the frame parameters may relate to the front face of the eyeglasses frame and may thus include one or more geometrical features of the frame face, such as:

the shape and/or position of the internal contour of the frame face or the lens shape geometry, at least 2D;
the shape and/or position of the external contour of the frame face, which may be the same as the internal contour if the eyeglasses frame is rimless;
the nose geometry and position;
the edge thickness, which is related to the difference between the internal and external contours of the frame;
the end piece position.

Thus, in most embodiments, the parameters relating to geometry of the eyeglasses frame may relate not only to the size of the frame, but comprise at least one other type of geometry parameter of the frame.

The frame parameters may also relate to the material of the frame face or to some decorative features of the frame, such as:

a color pattern or a list of colors;
a texture or a list of textures;
transparency or opacity of the frame;
the material(s) to be used;
the pad geometry;
the geometry and/or material and/or decorative features for the temple shape;
the shape of the hinges of the frame and/or their position in height;
a list of available eyeglasses frame modifications (type and range of values), such as a list of available color patterns, a list and range of values of possible deformations (pantoscopic angle, wrap angle, edge thickness range, shape deformation percentage or deformation range, etc.);
a list of geometrical constraints, such as a continuity order 0, 1 or 2, or a zone with no or little geometric deformation;
the designer name, the name of the eyeglasses frame, a brand name, elements concerning the frame style;

a metal insert, a chamfer on the outer edge, bevels, etc.

The frame parameters may be automatically determined using at least one processor, from the obtained current representation of the frame.

In a particular embodiment, step (ii) may further comprise:

allocating the information relating to the current representation of the frame to one or more predetermined clusters referring to categories taken in a group comprising a type of eyewear (e.g. clear eyeglasses or sunglasses), a type of frame (e.g. rimless, half-rim or full rim), a frame weight, a frame volume, a type of nose pad, a type of face shape (e.g. rectangle, flat, round, butterfly, pantos, wayfarer, square, diamond, pilot, half-moon, octagonal, oval, etc.); and
segmenting the cluster(s) based on frame color and/or frame material.

A predefined clustering may be used. As a variant, dynamic clusters may be defined, using for instance K-means methods, so that K clusters based on closest shapes can be created.

According to the present disclosure, the method further comprises a step (iii) of evaluating, by one or more processors, the relevance of the predetermined design, from the current representation, according to one or more predetermined relevance criterions and providing, by the processor(s), a feedback comprising a result of the evaluating.

The feedback may be provided for only one criterion, or for a number of selected criterions, or for all the criterions.

By way of non-limiting example, the result may comprise a score and/or a text, giving for example indications about the chances to meet success, for at least one specific relevance criterion. Based on the feedback, the frame designer may then decide to modify the frame design so as to improve it and achieve a better score.

Namely, the feedback may comprise criteria related to expected commercial success, taken in a group comprising:

an expected turnover to be obtained with an eyeglasses frame having a design corresponding to the current representation;
a number of expected sales of an eyeglasses frame having a design corresponding to the current representation; indeed, the frame designer may also have access to specific data such as feedback about commercial success of designs having similar features, or information on customers (such as age, profession, preferred style, etc.) having bought these designs, so that the designer may propose trendy colors, materials or adapt the design price, for example);
an expected or real number of people viewing online an eyeglasses frame design corresponding to an initial representation of the frame, which is the current representation when step (ii) is carried out for the first time; namely, the online traffic for each design, or for all the designs proposed by a given designer, may be tracked and reported, which is an indicator on the attractiveness, the popularity and the conversion rate of the designs;
an expected level of retail price of an eyeglasses frame having a design corresponding to the current representation;
an expected type of customer to be interested in buying an eyeglasses frame having a design corresponding to the current representation; the customer may be defined among a number of customer profiles (male/female, young/elder, job, activity, etc. representing known types of customers);

a wearer or customer's opinion about at least one eyeglasses frame design; for example, customers can give their opinion on previous eyewear designs they bought or they have seen, by giving each design a global rank relating to overall eyewear quality (ranging e.g. from 1 to 5, 5 being the best ranking and considering for example comfort or aesthetics) or a ranking of the similarity with the expected design and/or by providing positive and/or negative comments and/or by giving recommendations;

at least one output of an artificial intelligence-based tool predicting wearers' preferences on the basis of data gathered from a plurality of wearers.

In the above-mentioned embodiment involving clusters, the feedback comprises at least one feedback criterion for a frame in the same cluster and having the same color and/or material.

If the obtained information relating to the current representation of the frame design does not include the frame color and/or material, it is possible to provide a feedback for all possible combinations of color and material, so that the frame designer may then optimize these parameters to optimize the frame design.

In order to help the frame designer to optimize the frame design, the feedback may further comprise providing at least one proposed frame design having features in common with the predetermined design and features that are different from the predetermined design, the feedback comprising identifying the features in common and the features that are different.

By way of non-limiting example, the relevance criterion(s) may be related to one or more parameters taken in a group comprising:

resemblance or deviation between the representation of the frame and existing frames; a comparison between the proposed design and existing designs may be performed, so that it is not possible to propose a design for which too many similarities exist with a previously proposed design, which makes it possible for the frame designer to ensure that he or she will propose a design having a minimum degree of novelty; by way of non-limiting example, a degree or level of proximity, denoted Difference_Level(frame design, eyewear_i) between the proposed frame design and existing eyewear designs i may be based on the sum of multiple metrics, as follows: Difference_Level(frame design, eyewear_i)=A× Difference_mean_square_2DProjection(frame design, eyewear_i)+(after normalization) B×Difference_color (frame design, eyewear_i)+C×Difference_material (frame design, eyewear_i)+D×Difference_pattern (frame design, eyewear_i), where 2DProjection is the projection in a plane of the shape of the front face of the frame, color may be a cluster of colors (red, green, blue, orange, etc.) or the chromatic coordinates a, b in the color space defined by the CIE (Commission on Illumination, in French "Commission Internationale de l'Eclairage"), or defined as RAL®-Colors or Pantone® reference code, pattern may be information such as a multicolor eyewear with N colors, the proximity being null in case N is the same, or a type of geometrical pattern, the proximity being determined from the difference between spectral powers calculated from the Fourier transform of the eyewear pattern (Difference_pattern(P1,P2)=$\Sigma$|TF(P1)|$^2$−|TF(P2)$^2$|, where TF(Pi) is the Fourier transform of pattern Pi) and parameters A, B, C, D are positive and relative weightings that can be determined from trials; the higher the value of Difference_Level, the higher the difference between the frame design and the eyewear design i; the value of Difference_Level can be calculated for the closest existing eyewear and the lowest value can be compared with a predetermined threshold and, if the lowest value is below the threshold, this means that the similarity is too high;

compliance with predetermined frame design rules; for example, it can be checked whether the range of a number of parameters is correct according to some rules (range of thickness of the frame; pantoscopic tilt linked to the targeted geographic business area, the classical range being 6-12° in France and 0-9° in China; wrap angle between 2 and 8° according to the geographic area, or even up to 25° for some sports-specific eyewear; caliber of the lens and the frame, position of the end piece and the bridge according to the gender, age and geographic area of origin of the targeted wearer; nose pad height around 9-11 mm for comfort; frontal angle and splay angle according to the geographic area of origin of the targeted wearer, for example the splay angle is around 12° in Europe and close to 23° in China); the parameters may be checked using design rules traditionally used in the industry, or based on statistical analysis on a set of frames, or by using a decision tree; the feedback may be whether the minimal design rules are complied with or not and, if not, additional feedback may be an indication about the design rule being broken;

manufacturability; for example, the relevance criterion(s) may be related to the availability of the material, the time for delivery, the manufacturing cost, the manufacturing process (for example, in the case of a 3D printing process, for achieving a sufficient mechanical resistance of the printed frame, a minimal thickness of the frame is required and a minimal section of the frame is required, especially on stress points), the consistency of the 2D drawing of the frame if the information relating to the current representation of the frame is a 2D drawing (are all curves on the drawing closed, is the minimum thickness high enough, etc.);

expected number of sales of the frame and/or number of sales of at least one other frame having a predetermined resemblance with the predetermined frame.

By way of non-limiting example, the relevance criterion(s) may also be related to compliance with at least one wearer-related parameter, taken in a group comprising:

morphological parameters related to a face of a predetermined wearer population;

parameters related to a lens prescription of the wearer population;

other lens parameters, for example, the geometry of the lens, the material of lens, whether it is a clear or photochromic lens, etc.; and preferred parameters provided by the wearer population.

By way of non-limiting example, the preferred parameters provided by the wearer population may be taken in a group comprising parameters relating to the general look, style, shape, material, color and wearing comfort of the eyeglasses frame.

Optionally, as shown in dashed lined in FIG. 1, in addition to steps (i) to (iii), the method according to the present disclosure may further comprise a step (iv) of checking whether the result of the evaluating step (iii) reaches a predetermined target.

Next, during a step (v), a loop is performed as long as the result does not reach the target, comprising:

providing, in the feedback, recommendations as to how to modify the representation of the predetermined frame;

based on these recommendations, obtaining modified information relating to a modified representation of the frame; and iterating steps (iii) to (v) by using the modified representation as the current representation of the frame, so as to provide an optimized frame design.

In such an embodiment, by way of non-limiting example, the evaluating based on the modified representation may comprise assigning to the result a value closer to the target if the modified representation of the frame has at the same time features in common with an initial representation of the frame, which is the current representation when step (ii) is carried out for the first time, and features different from the initial representation, than if said frame has no features in common with the initial representation.

When the result of the evaluating reaches the target, the frame design is considered as being optimized. Then optionally, the method may further comprise a final step of manufacturing a frame having the optimized frame design.

Figure 2:
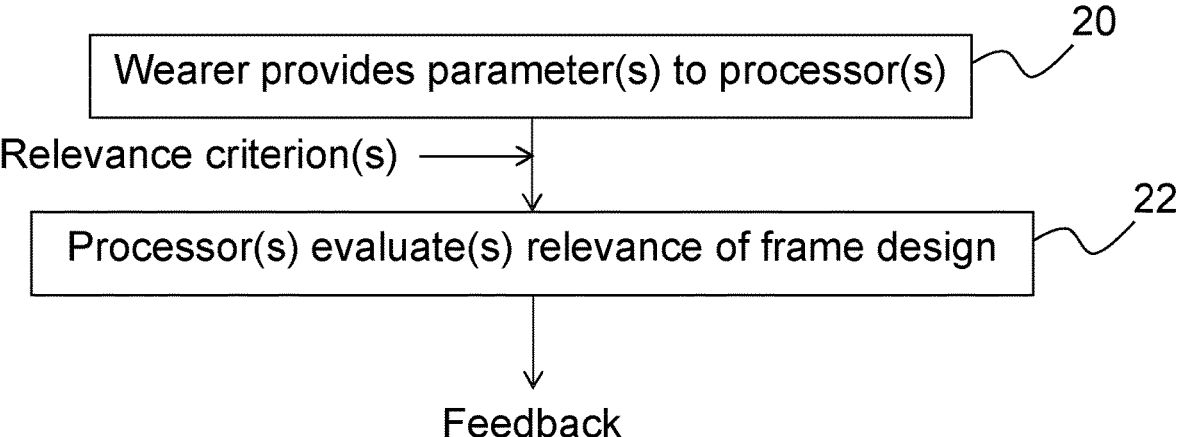
FIG. 2 is a flowchart showing steps of a method for a wearer to obtain an automatically performed evaluation of the relevance of the design of an eyeglasses frame according to the disclosure, in a particular embodiment.

As shown in the flowchart of FIG. 2, the evaluating may be used to provide a feedback not only to a frame designer about the relevance of a frame design proposed by him or her, but also to provide a feedback to a wearer about a frame design built on the basis of parameters provided by the wearer.

Namely, another computer-implemented method according to the present disclosure is a method for a wearer to obtain an automatically performed evaluation of the relevance of the design of an eyeglasses frame.

In a particular embodiment of that method, during a first step 20, the wearer provides to one or more processors one or more parameters relating to the wearer and/or related to the frame design.

The parameters related to the frame design that are provided by the wearer may be similar to the frame parameters listed in relationship with the above-described method for automatically evaluating the relevance of an eyeglasses frame design.

Namely, the frame design parameters provided by the wearer may be:

parameters relating to geometry of the eyeglasses frame;

parameters relating to material of the eyeglasses frame; and parameters relating to manufacturing techniques for manufacturing the eyeglasses frame.

By way of non-limiting example, the frame parameters provided by the wearer may relate to the front face of the eyeglasses frame and may thus include one or more geometrical features of the frame face, such as:

the shape and/or position of the internal contour of the frame face or the lens shape geometry, at least 2D;

the shape and/or position of the external contour of the frame face, which may be the same as the internal contour if the eyeglasses frame is rimless;

the nose geometry and position;

the edge thickness, which is related to the difference between the internal and external contours of the frame;

the end piece position.

Thus, in most embodiments, the parameters relating to geometry of the eyeglasses frame provided by the wearer may relate not only to the size of the frame, but comprise at least one other type of geometry parameter of the frame.

The frame parameters provided by the wearer may also relate to the material of the frame face or to some decorative features of the frame, such as:

a color pattern or a list of colors;

a texture or a list of textures;

transparency or opacity of the frame;

the material(s) to be used;

the pad geometry;

the geometry and/or material and/or decorative features for the temple shape;

the shape of the hinges of the frame and/or their position in height;

a list of available eyeglasses frame modifications (type and range of values), such as a list of available color patterns, a list and range of values of possible deformations (pantoscopic angle, wrap angle, edge thickness range, shape deformation percentage or deformation range, etc.);

a list of geometrical constraints, such as a continuity order 0, 1 or 2, or a zone with no or little geometric deformation;

the designer name, the name of the eyeglasses frame, a brand name, elements concerning the frame style;

a metal insert, a chamfer on the outer edge, bevels, etc.

The parameters provided by the wearer and relating to that wearer may be taken among the following ones:

morphological parameters related to the face of the wearer, for example face morphology, possibly including head size at the location of the ear and/or at the location of the orbit and/or possibly including eyebrow position, cheekbones, nose size, hair or skin color, etc.; such morphological parameters may be obtained for example by using a photo provided by the wearer, or by performing 3D face scanning of the wearer if the wearer is either present physically or equipped with an image capture device; and preferred parameters provided by the wearer, i.e. parameters given by the wearer as a contribution for customizing the eyeglasses frame.

By way of non-limiting example, the preferred parameters provided by the wearer, or more generally by any user, may be taken in a group comprising parameters relating to the general look, style, shape (e.g. rectangular, square, circular, oval, cat-eye, butterfly, aviator, classical . . . ), material and color of the eyeglasses frame.

Optionally, the type of lenses to be fitted in the eyeglasses frame may also be taken into account for customizing the frame.

Then, during a step 22, the one or more processors evaluate(s) the relevance of any frame design matching the one or more parameters provided by the wearer, according to one or more predetermined relevance criterions and the wearer receives from the one or more processors a feedback comprising the result of the evaluating, in a similar manner as described above in relationship with the method for automatically evaluating the relevance of an eyeglasses frame design.

By way of non-limiting examples, the feedback to the wearer or to the ECP may comprise:

a proposed list of frames that are compliant with the one or more parameters provided by the wearer;

a selection of frames;

personalization loops for fitting the frame to the wearer;

a selection of manufacturers;

an estimation/calculation/determination of manufacturing costs of the frame;

a proposal for the wearer to order a frame.

The relevance criterion(s) are the same as described above in relationship with the method for automatically evaluating the relevance of the design of an eyeglasses frame.

Figure 3:
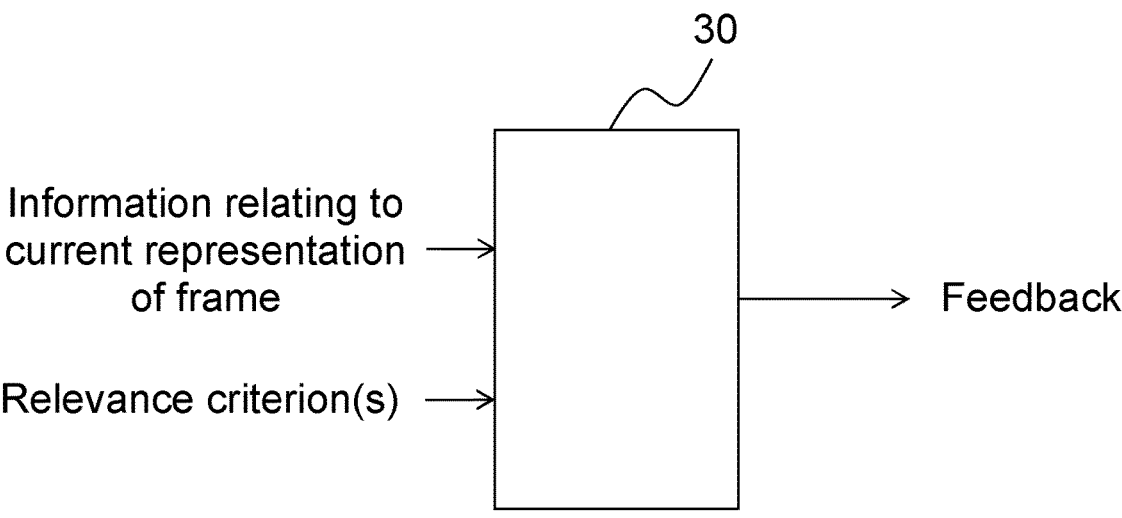
FIG. 3 is a schematic view of a system for automatically evaluating the relevance of the design of an eyeglasses frame according to the disclosure, in a particular embodiment.

A system for automatically evaluating the relevance of the design of an eyeglasses frame according to the present disclosure will now be described with reference to FIG. 3.

The system may be implemented or integrated as a part of a more global assembly taking e.g. the form of a platform, which makes it possible for various actors such as the users (customers wishing to acquire customized eyeglasses, ECPs, eyeglasses wearers, etc.), the eyeglasses frame designers, the eyeglasses frame manufacturers and possibly the lens manufacturers, to upload and download information and to benefit from the actions made by other actors via the platform.

Similarly to the methods described above in detail, the system comprises:

at least one processor 30 configured for:

(i) obtaining a predetermined frame having a predetermined design;

(ii) obtaining information relating to a current representation of the predetermined frame;

(iii) evaluating a relevance of the predetermined design, from the current representation, according to at least one predetermined relevance criterion and providing, by the at least one processor 30, a feedback comprising a result of the evaluating.

The same one or more processors 30 may also be used for implementing the method for the wearer to obtain an automatically performed evaluation of the relevance of the design of an eyeglasses frame as described above. In such embodiments, the processor(s) 30 receives from the wearer one or more parameters relating to that wearer and/or related to the frame design, evaluates the relevance of any frame design matching the one or more parameters, according to one or more relevance criterions and provides the wearer with a feedback comprising the result of the evaluating.

The methods according to the invention are computer-implemented. Namely, a computer program product comprises one or more sequences of instructions that are accessible to a processor which may be the above-mentioned at least one processor and that, when executed by the processor, cause the processor to carry out steps of the methods as described above.

The sequence(s) of instructions may be stored in one or several non-transitory information storage medium/media which may be computer-readable, such storage medium/media possibly including a predetermined location in a cloud.

Although representative systems and methods have been described in detail herein, those skilled in the art will recognize that various substitutions and modifications may be made without departing from the scope of what is described and defined by the appended claims.

The invention claimed is:

1. A computer-implemented method for automatically evaluating a relevance of a design of an eyeglasses frame, the method comprising:

obtaining any predetermined frame having any predetermined design;

obtaining information relating to a current representation of said predetermined frame;

evaluating, by at least one processor, a relevance of said predetermined design, from said current representation, according to at least one predetermined relevance criterion and providing, by said at least one processor, a feedback comprising a result of said evaluating;

checking whether said result reaches a predetermined target;

as long said result does not reach said predetermined target:

providing, in said feedback, recommendations as to how to modify said representation of said predetermined frame, based said recommendations, obtaining modified information relating to modified representation of said frame, and iterating the evaluating, the checking, the providing, and the obtaining the modified information by using said modified representation said current representation of said frame, to provide optimized frame design.

2. The method according to claim 1, wherein said evaluating based on said modified representation comprises assigning to said result a value closer to said predetermined target in a case in which said modified representation of said frame has at the same time features in common with an initial representation of said frame, which is said current representation when the obtaining the information relating to the current representation is carried out for the first time, and features different from said initial representation, than in a case in which said frame has no features in common with said initial representation.

3. The method according to claim 2, further comprising manufacturing a frame having said optimized frame design.

4. The method according to claim 3, wherein said relevance criterion is related to at least one parameter from a group comprising:

a resemblance or a deviation between said representation of said frame and existing frames, a compliance with predetermined frame design rules, manufacturability, and one or more of an expected number of sales of said frame and a number of sales of at least one other frame having a predetermined resemblance with said frame.

5. The method according to claim 4, wherein said relevance criterion is related to compliance with at least one wearer-related parameter, taken in a group comprising:

morphological related to a face of a predetermined wearer populations, parameters related to a lens prescription of said wearer population, other lens parameters, and preferred parameters provided by said wearer population.

6. The method according to claim 5, wherein said preferred parameters provided by said wearer population are from a group comprising parameters relating to the general look, style, shape, material, color and wearing comfort of said eyeglasses frame.

7. The method according to claim 1, wherein said providing the feedback further comprises providing at least one proposed frame design having features in common with said predetermined design and features that are different from said predetermined design, said feedback comprising identifying said features in common and said features that are different.

8. The method according to claim 1, further comprising manufacturing a frame having said optimized frame design.

9. The method according to claim 1, wherein said relevance criterion is related to at least one parameter from a group comprising:

a resemblance or a deviation between said representation of said frame and existing frames, a compliance with predetermined frame design rules, manufacturability, and one or more of an expected number of sales of said frame and a number of sales of at least one other frame having a predetermined resemblance with said frame.

10. The method according to claim 1, wherein said relevance criterion is related to a compliance with at least one wearer-related parameter, from a group comprising:

morphological parameters related to a face of a predetermined wearer population, parameters related to a lens prescription of said wearer population, other lens parameters, and preferred parameters provided by said wearer population.

11. The method according to claim 10, wherein said preferred parameters provided by said wearer population are from a group comprising parameters relating to a general look, style, shape, material, color and wearing comfort of said eyeglasses frame.

12. The method according to claim 1, wherein said result comprises one or more of a score and a text.

13. The method according to claim 1, wherein said feedback further comprises criteria related to expected commercial success, from a group comprising:

an expected turnover to be obtained with an eyeglasses frame having a design corresponding to said current representation, a number of expected sales of an eyeglasses frame having a design corresponding to said current representation, an expected or real number of people viewing online an eyeglasses frame design corresponding to an initial representation of said frame, which is said current representation when the obtaining the information relating to the current representation is carried out for the first time, an expected level of retail price of an eyeglasses frame having a design corresponding to said current representation, an expected type of customer to be interested in buying an eyeglasses frame having a design corresponding to said current representation, a wearer or customer's opinion about at least one eyeglasses frame design, and at least one output of an artificial intelligence-based tool predicting wearers' preferences based on data gathered from a plurality of wearers.

14. The method according to claim 1, wherein the obtaining the information relating to the current representation further comprises:

allocating said information relating to a current representation of said frame to at least one predetermined cluster referring to categories taken in a group comprising a type of eyewear, a type of frame, a frame weight, a frame volume, a type of nose pad, a type of face shaper, and segmenting said at least one cluster based on one or more of frame color and frame material,

wherein said feedback comprises at least one feedback criterion for a frame in the same cluster and having one or more of the same color and material.

15. A system for automatically evaluating a relevance of a design of an eyeglasses frame, the system comprising at least one processor configured for performing the method of claim 1.

16. A computer-implemented method for a wearer to obtain an automatically performed evaluation of a relevance of a design of an eyeglasses frame, the method comprising:

providing to at least one processor, by said wearer, at least one parameter one or more of relating to said wearer and related to said frame design;

evaluating, by said at least one processor, a relevance of a frame design matching said at least one parameter, according to at least one predetermined relevance criterion and receiving, by said wearer, from said at least one processor, a feedback comprising a result of said evaluating;

checking whether said result reaches a predetermined target; and as long as said result does not reach said predetermined target:

providing, in said feedback, recommendations as to how to modify said representation of said predetermined frame, based said recommendations, obtaining modified information relating to modified representation of said frame, and iterating the evaluating, the checking, the providing, and the obtaining the modified information by using said modified representation said current representation of said frame, to provide optimized frame design.

17. A non-transitory computer-readable information storage medium on which is stored one or more sequences of instructions that are accessible to a processor and that, when executed by said processor, cause said processor to:

obtain a predetermined frame having a predetermined design;

obtain information relating to a current representation of said predetermined frame;

evaluate a relevance of said predetermined design, from said current representation, according to at least one predetermined relevance criterion and providing, by said at least one processor, a feedback comprising a result of said evaluating;

checking whether said result reaches a predetermined target; and long said result does not reach predetermined target:

providing, in said feedback, recommendations as to how to modify said representation said predetermined frame, based on said recommendations, obtaining modified information relating to modified representation of said frame, and iterating the evaluating, the checking, the providing, and the obtaining the modified information by using said modified representation as said current representation of said frame, to provide an optimized frame design.

* * * * *